United States Patent [19]

Ko

[11] Patent Number: 5,172,221
[45] Date of Patent: Dec. 15, 1992

[54] PICTURE PROJECTING APPARATUS FOR A PROJECTION DISPLAY SYSTEM AND THE METHOD THEREOF

[75] Inventor: Han-il Ko, Suwon, Rep. of Korea
[73] Assignee: Samsung Electronics Co., Ltd., Kyunggi, Rep. of Korea
[21] Appl. No.: 728,689
[22] Filed: Jul. 12, 1991

Related U.S. Application Data

[63] Continuation-in-part of Ser. No. 626,283, Dec. 12, 1990, abandoned.

[30] Foreign Application Priority Data

Dec. 29, 1989 [KR] Rep. of Korea ............... 89-20097

[51] Int. Cl.$^5$ ............................................. H04N 9/30
[52] U.S. Cl. ............................................. 358/61; 358/60; 359/63; 359/84
[58] Field of Search ............... 258/60, 61, 64, 65-67, 258/74; 350/331 R, 31, 34; 359/68, 84, 63

[56] References Cited

U.S. PATENT DOCUMENTS

| | | | |
|---|---|---|---|
| 4,786,146 | 11/1988 | Ledebuhr | 353/20 |
| 4,977,447 | 12/1990 | Takenaka et al. | 358/64 |
| 4,982,276 | 1/1991 | Kawashima et al. | 358/60 |
| 5,083,195 | 1/1992 | Evelin | 358/64 |
| 5,105,263 | 4/1992 | Shioda | 359/84 |

Primary Examiner—Edward L. Coles, Sr.
Assistant Examiner—Kim Yen Vu
Attorney, Agent, or Firm—Cushman, Darby & Cushman

[57] ABSTRACT

A picture projecting apparatus for a projection display system and the method thereof are disclosed. The apparatus converts color video signals which are red, green and blue colors arranged in series, to light signals which have the wavelengths of the light corresponding to the respective red, green and blue colors for a vertical scanning line, separates the red, green and blue monochromatic component lights from the converted light signals, and focuses the separated red, green and blue component lights. Accordingly, the red, green and blue color video signals converted to have a triple speed is scanned to a monochrome picture tube, to separate and reflect the light signal generated from the monochrome picture tube into red, green and blue component signals through dichroic mirrors and mirrors. At this time, according to input synchronizing signals of the red, green and blue video signals, electronic liquid crystal shutters, respectively composed of a single pixel, are driven to select separated red, green and blue component signals and focus through a lens thereby being projected on a large color screen of high resolution.

18 Claims, 8 Drawing Sheets

PICTURE PROJECTING APPARATUS FOR A PROJECTION DISPLAY SYSTEM AND THE METHOD THEREOF

This patent application is a continuation-in-part of application Ser. No. 07/626,283 filed Dec. 12, 1990 which is now abandoned.

BACKGROUND OF THE INVENTION

The present invention relates to a projection display system, and particularly to a picture projecting apparatus for a projection display system and the method thereof which can project a large color picture by a monochrome projection tube only.

A direct type display apparatus generally used such as a CRT is getting larger in its size, but the according rapid increase of the volume and the weight makes it practically impossible to manufacture a Braun tube larger than 45 inch.

Accordingly, a projection display system appears to project an image displayed on a CRT into a large screen so as to make it easier to watch in the distance.

The simplest projection system has a constitution in which images displayed on a picture tube is projected through an optical system on a screen. But, in this system, the deterioration of the resolution makes it not good for the formation of a large picture.

Figure 1:
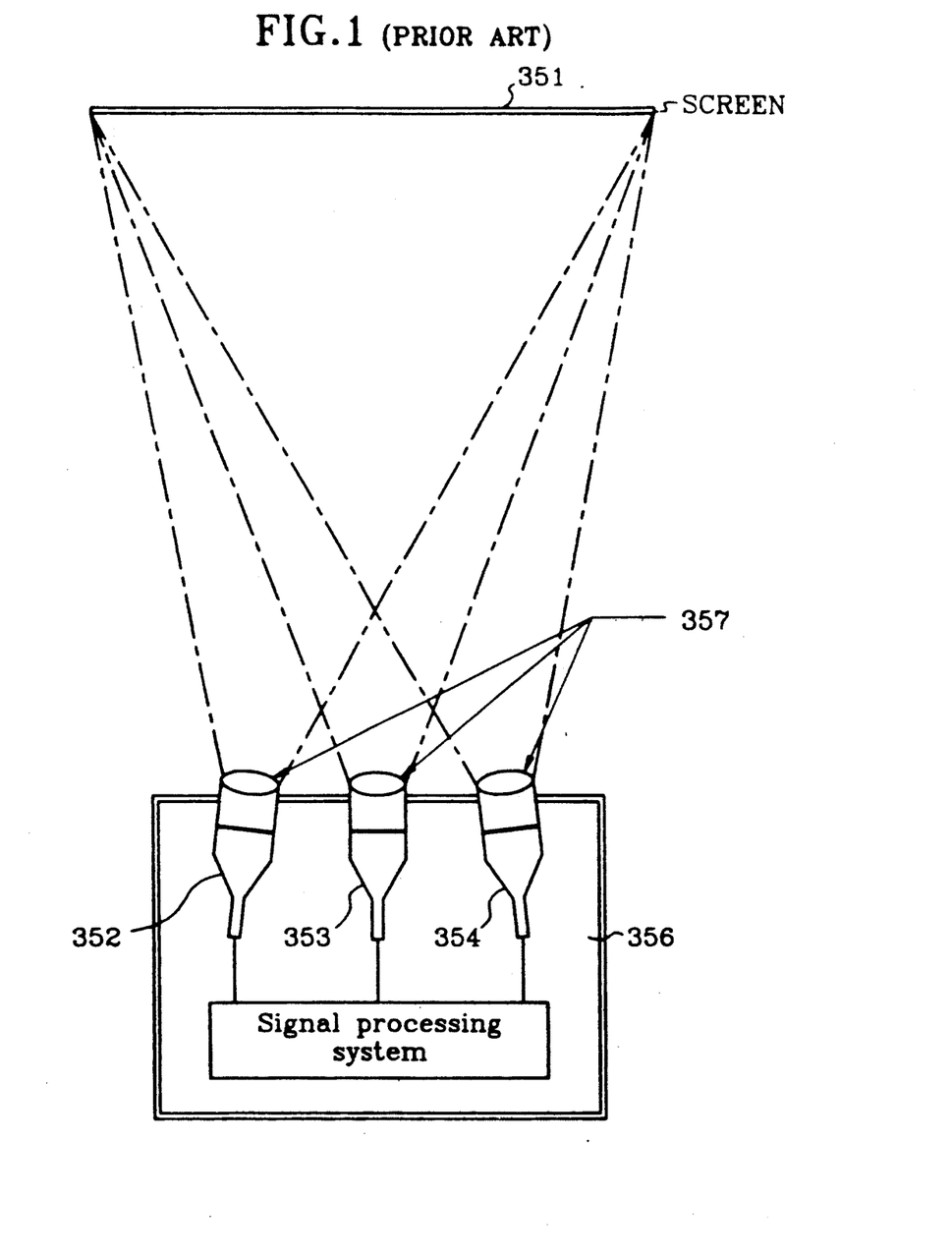
FIG. 1 schematically illustrate a conventional picture projecting apparatus using red, green and blue picture tubes.

Thus, as shown in FIG. 1, a conventional projection display system has been used, in which the respective red, green and blue of single color images are shown on three monochromic picture tubes or projection tubes 352, 353 and 354, and then are projected through a focusing lens 357 on a screen 351, to form a color picture. However, the requirement of three independent projection tubes in this constitution results in high cost and difficulty of convergence control.

Figure 2:
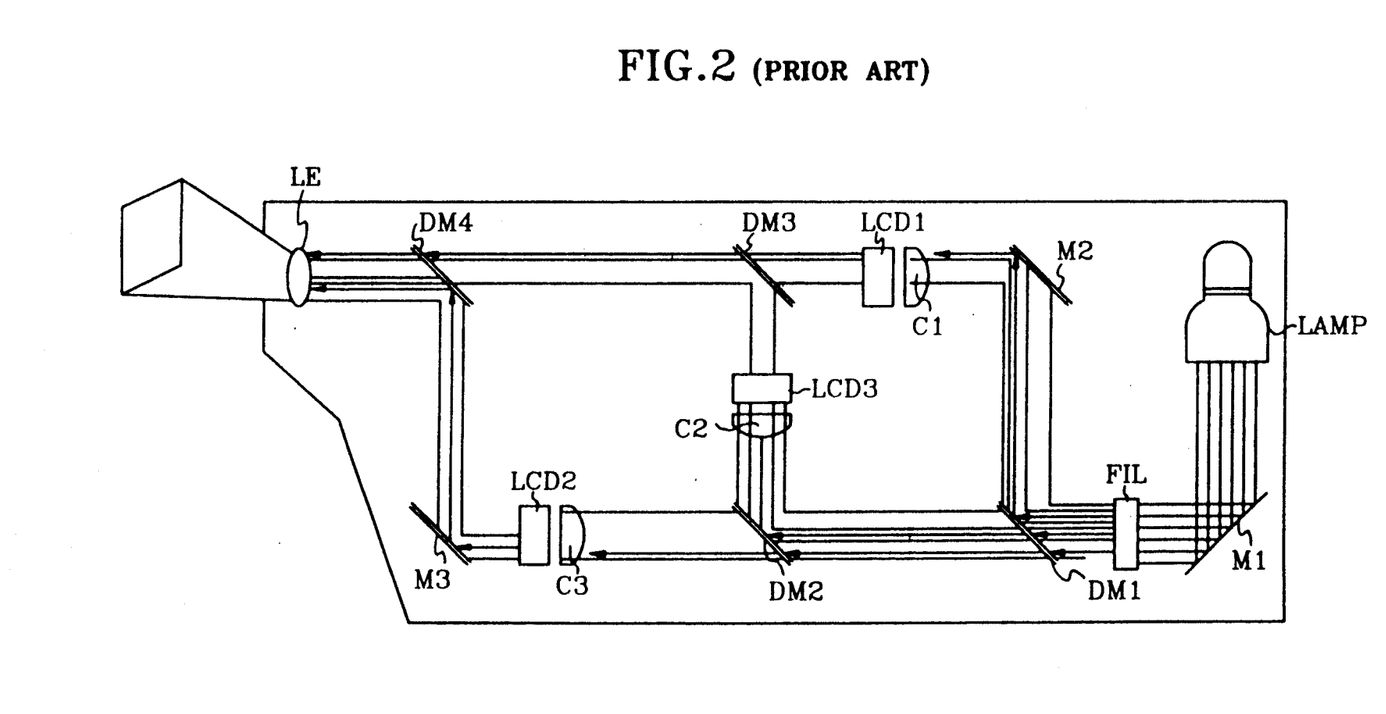
FIG. 2 schematically illustrate another conventional picture projecting apparatus using liquid crystal display devices.

As shown in FIG. 2, another example of conventional projection system is a liquid light valve type picture projection system in which three red, green, and blue liquid crystal display devices LCD1, LCD2 and LCD3 respectively display red, green and blue monochromatic pictures. In this system, a white light generated in a light source LAMP is separated into three red, green, and blue monochromatic lights through mirrors M1 and M2 and dichroic mirrors DM1, DM2 and DM3 and then the separated monochromatic lights are scanned as a driving light for the respective liquid crystal display devices LCD1, LCD2 and LCD3 to form the respective monochromatic pictures, and these monochromatic pictures are projected through a mirror M3 and dichroic mirrors DM3 and DM4, and a lens LE on a screen so as to form a color image. The unexplained reference numerals FIL and C1 to C3 respectively indicates a filter, and focusing lenses of a driving tube.

In this constitution, pictures to be projected are formed on the respective liquid crystal display devices, and the resolution of the system depends on the number of the pixels of the liquid crystal display device. But, currently there is a limitation in increasing the number of the pixels in liquid crystal display devices, so that this system is not appropriate for a high resolution system.

SUMMARY OF THE INVENTION

Accordingly, it is an object of the present invention to provide a picture projecting apparatus for a projection display system which can economically display a large color image of a high resolution by using only one monochrome projection tube.

It is another object of the present invention to provide a picture projection method especially appropriate for the above-described projection display system.

To achieve these and other objects, a picture projecting apparatus for a projection display system according to the present invention comprises:

means for converting color video signals arranged in series with red, green, and blue to light signals having the respective wavelengths of the light with respect to a horizontal scanning line;

means for separating the converted light signal into the respective red, green and blue monochromatic component signals; and means for focusing the separated red, green and blue component signals.

In addition, the picture projecting method of the projection display system according to the present invention comprises the steps of:

multiplying the speed of color video signals of red, green and blue for converting the signals into a serial color video signal having a prescribed multiplied speed;

converting the serial signal into light signals having wavelengths corresponding to the red, green and blue colors through a monochrome picture tube;

separating the converted light signals into a plurality of component light signals, each of which respectively corresponds to the red, green and blue colors; and focusing the separated component light signals of red, green and blue.

BRIEF DESCRIPTION OF THE DRAWINGS

The above objects and other advantages of the present invention will become more apparent by describing preferred embodiments of the present invention with reference to the attached drawings, in which.

DETAILED DESCRIPTION OF THE INVENTION

Figure 3:
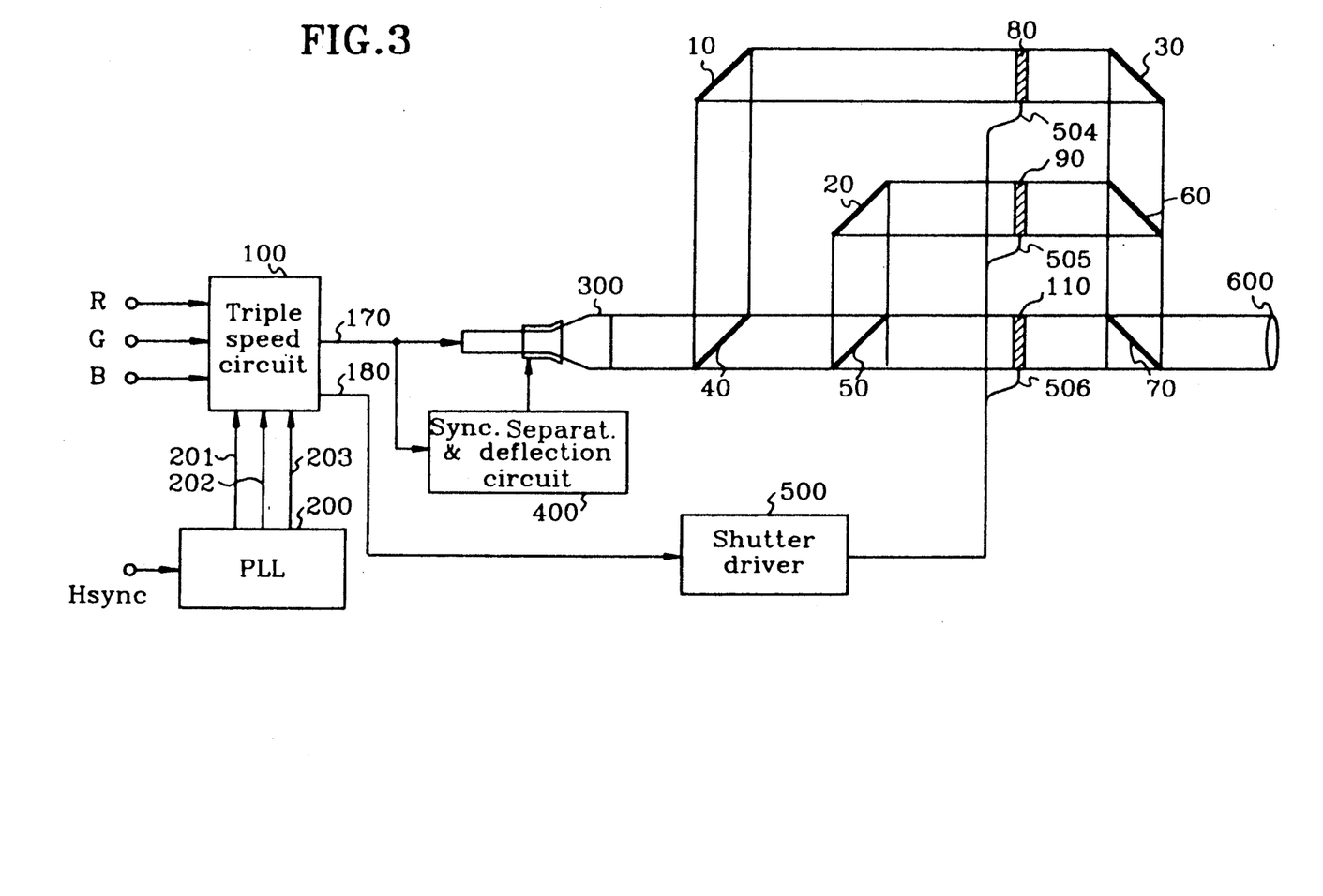
FIG. 3 is a block diagram of a picture projecting apparatus according to the present invention.

FIG. 3 shows an embodiment of a picture projecting apparatus according to the present invention.

In the drawing, a triple speed circuit 100 triples the input or execution speeds of red, green and blue video signals inputted from red, green and blue input terminals R, G, and B and generates the tripled video signals in series. A PLL circuit 200 receives a horizontal synchronizing signal of a horizontal synchronizing signal terminal Hsync outputted from an unshown synchronous detecting circuit and generates control signals 201, 202 and 203 for tripling the speed of red, green and blue signals of the triple speed circuit 100 by a PLL method. A picture tube 300 receives red, green and blue analog signals having a triple speed and outputted through a line 170 from the triple speed circuit 100, scans the signals in a triple speed, namely a speed of three times faster than normal speed, and then displays the signals in a monochrome image. A synchronous separation and deflection circuit 400 separates synchronizing signals from the tripled outputs of red, green, and blue video signals including composite synchroizing signals outputted through the line 170 from the triple speed circuit 100, and generates vertical and horizontal synchronizing signals for vertical and horizontal deflection in order to scan video signals in the triple speed to the picture tube 300.

First to third electronic liquid crystal shutters 80, 90 and 110 are for selectively transmitting red, green, and blue monochromatic light signals in response to electric control signals. A shutter driver 500 decodes switching signals for outputting red, green, and blue video signals outputted through a line 180 from the triple speed circuit 100 to generate driving signals for sequentially passing the red, green and blue monochromatic light signals of the first, second and third electronic liquid crystal shutters 80, 90 and 110.

A first dichroic mirror 40 totally reflects a red component by 90° and transmits blue and green components, according to wavelengths of the light from images displayed in a monochrome on the screen of the picture tube 300, and a second dichroic mirror 50 totally reflects the green component by 90° and transmits the blue component, from the blue and green components transmitted from the first dichroic mirror 40. A first mirror 10 and a second mirror 20 horizontally and totally reflect by 90° the red and green components totally reflected from the first mirror 40 and the second mirror 50, and a third mirror 30 totally reflects by 90° the red component reflected from the first mirror 10 and outputted via the first electronic liquid crystal shutter 80 in response to an output of the shutter driver 500.

A third dichoric mirror 60 totally reflects by 90° the green component totally reflected on the second mirror 20 and outputted via the second electronic liquid crystal shutter 90, according to an output of the shutter driver 500 and the wavelength of the light, and transmits the red component totally reflected on the third mirror 30.

A fourth dichoric mirror 70 transmits the blue component of the second dichroic mirror 50 outputted via the third electronic liquid crystal shutter 110 according to an output of the shutter driver 500 and the wavelength of the light, and totally reflects the red and green components by 90 degrees.

A lens 600 focuses the output of the fourth dichroic mirror 70 to project the output in a large color screen by controlling a multiplication factor.

The picture projecting method by using the apparatus according to the present invention having the above-described constitution is as follows.

In the present invention having the constitution shown as FIG. 3, first of all, a speed tripling step is carried out in which the input or execution speed of red, green and blue video signals including synchronizing signals is tripled according to a predetermined control signal generated from a horizontal synchronizing signal by a PLL method, to be outputted in series.

Then is performed a synchronous separating step for separating vertical and horizontal synchronizing signals from the red, green and blue video signals of the triple speed serially outputted from the above speed tripling step, and then a display step is carried out in which the red, green and blue video signals having a triple speed are inputted in series from the above triple speed converting step, and are deflected according to the vertical and horizontal synchronizing signals outputted from the above synchronous separating step, to be displayed in a monochrome image.

A step of selectively separating and reflecting the red, green and blue monochromatic components according to the wavelengths of the light from monochromatic light signals displayed in the above displaying step is carried out, and a selecting step in which the red, green and blue component signals separated from the above separating and reflecting step are serially and selectively passed in response to switching signals for outputting the red, green and blue video signals having a tripled speed in the above speed tripling step is performed.

Finally, a focusing and projecting step is carried out in which the red, green and blue component signals passed from the above selecting step are composed and projected on a screen by controlling a multiplication factor during focusing.

Figure 4:
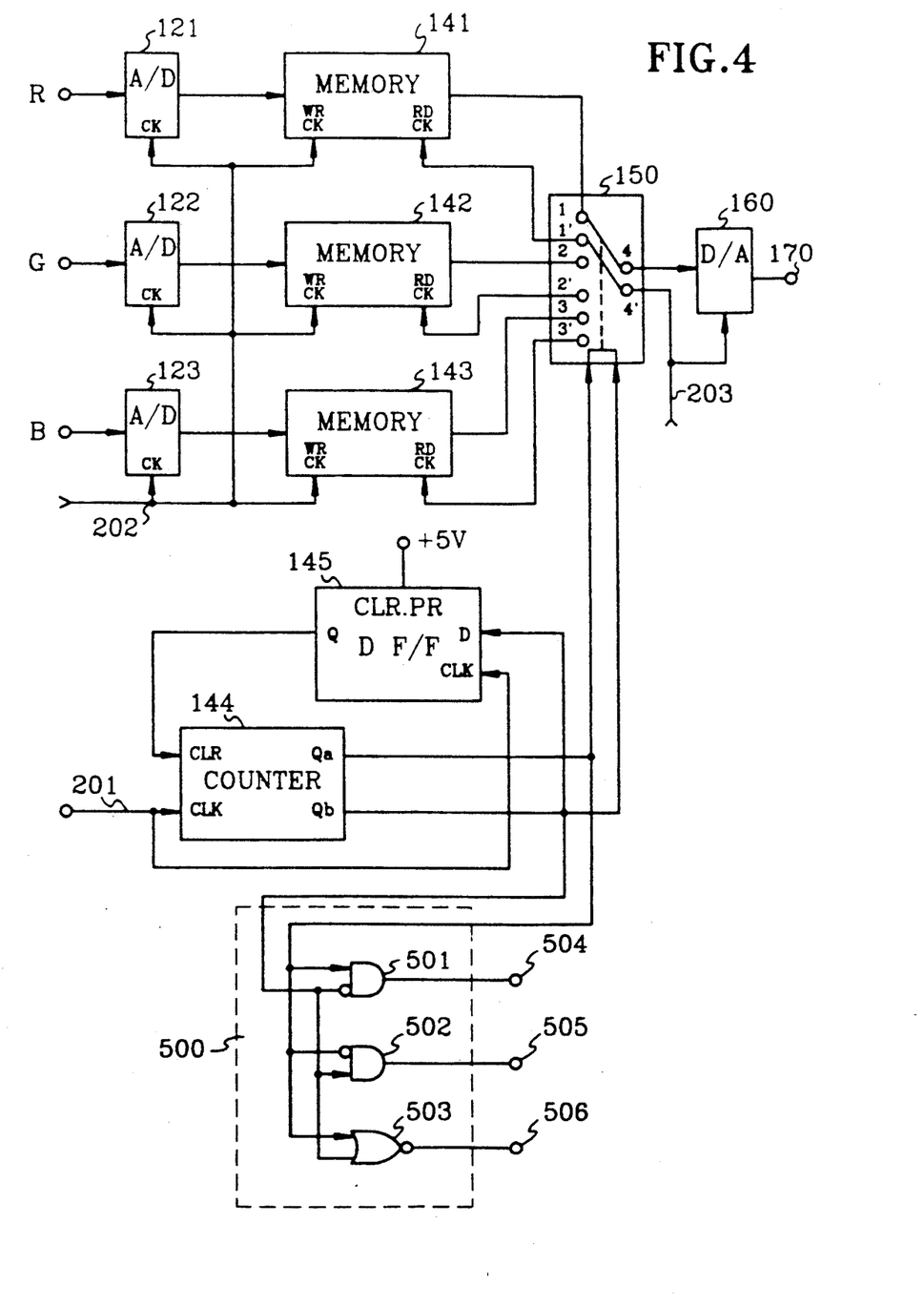
FIG. 4 is a schematic circuit diagram of a triple speed circuit and a shutter driver of the apparatus shown in FIG. 3.

FIG. 4, which is a detailed circuit diagram of the triple speed circuit 100 and the shutter driver 500 of the apparatus shown in FIG. 3, shows the following constitution.

First, second and third A/D converters 121 to 123 convert, red, green and blue analog video signals inputted through the red, green and blue input terminals R, G and B to digital data by a sampling signal of 8 MHz which is outputted from the PLL circuit 200 and then inputted to a write-in controlling clock and sampling frequency terminal 202.

First, second, and third memories 141 to 143 are to be successively written with the digital data ouputted from the first to third A/D converters 121 to 123 according to the address signals counted by input clocks of the write-in controlling clock and sampling frequency terminal 202 receiving the signal outputted form the PLL circuit 200. And the above written data are read out by address signals which is formed by counting input signals having three times larger frequency than that of the write-in controlling clock and sampling frequency terminal 203.

That is, during recording, red, green and blue signals are sequentially recorded on the memories 141 to 143 every one horizontal synchronizing signal interval according to the 8 MHz sampling signal and during reproducing, red, green and blue signals are reproduced from the memories 141 to 143 at the same time according to the 24 MHz sampling signal. Here, the memory used is a line memory having a capacity enough to record and store the digital data outputted from the first to third A/D converters 121 to 123.

A counter 144 receives and counts control signals of a control signal terminal 201 which receives, in turn, signals outputted from the PLL circuit 200. And a D flip-flop 145 receives an input of the control signal terminal 201 as a clock signal, latches an output of the counter 144, and then produces a clear signal of the counter 144.

A switch 150 is switched according to states of output terminals Qa and Qb of the counter 144, then supplies a 24 MHz clock of the read-out controlling clock and sampling frequency terminal 203 to the read-out clock terminal RD CK of the first to third memories 141 to 143, to control the outputs of the first to third memories 141 to 143.

A D/A converter 160 converts the outputs of the first to third memories 141 to 143 to analog signals according to a sampling signal of the read-out controlling clock and sampling frequency terminal 203.

On the other hand, the output terminals Qa and Qb of the countner 144 are respectively connected to input terminals of AND gates 501, 502 and a NOR gate 503 in the shutter driver 500, the output terminal 504 of the AND gate 501 is connected to the first electronic liquid crystal shutter 80 for passing red light, the output terminal 505 of the AND gate 502 is connected to the second electronic liquid crystal shutter 90 for passing green light, and the output terminal 506 of the NOR gate 503 is connected to the third electronic liquid crystal shutter 110 for passing blue light.

Figure 5:
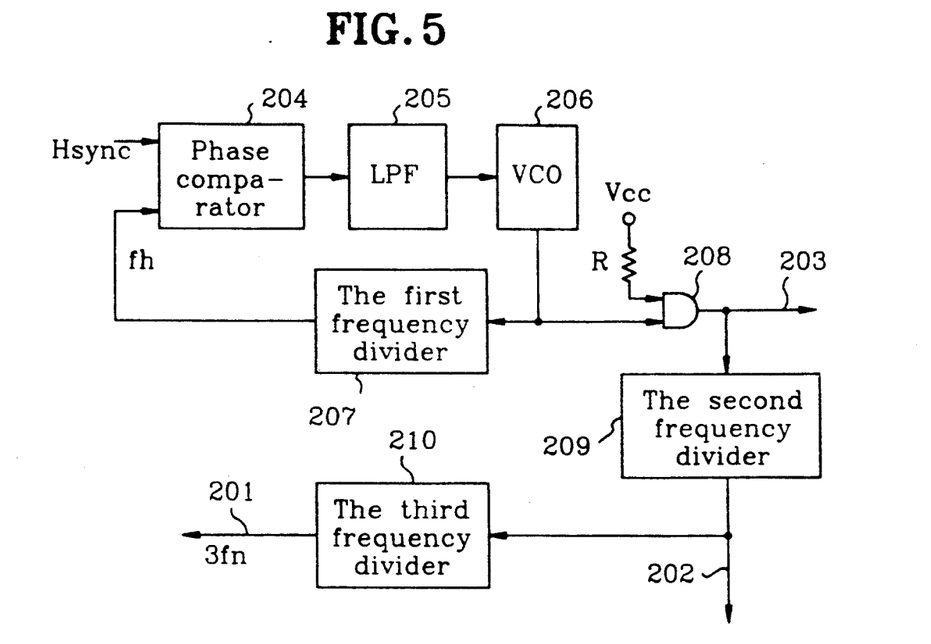
FIG. 5 is a schematic block diagram of an embodiment of the PLL circuit of the apparatus shown in FIG. 3.

FIG. 5 is a schematic block diagram of an embodiment of the PLL circuit 200 shown in FIG. 3 according to the present invention.

Referring to FIG. 5, a phase comparator 204 compares the phase of a horizontal synchronizing signal fo the horizontal synchronizing signal terminal Hsync with the phase of a signal fedback via a first frequency divider 207 and outputs the difference between two phases. A low-pass filter (LPF) 205 low band filters and output of the phase comparator 204 and converts the output to a direct voltage level. A voltage control oscillator (VCO) 206 generates an oscillating frequency of 24 MHz according to the output level of the low-pass filter 205.

A first frequency divider 207 demultiplies the output (24 MHz) of the voltage control oscillator 206 by a predetermined value (24 MHz/fh), i.e. 24 MHz÷(24 MHz/fh), and then generates the signal (fh) which has a different pulse width, i.e. a different phase from the horizontal synchronizing signal (Hsync) and has the same frequency and period, and then outputs the signal (fh) to the phase comparator 204.

An AND gate 208 supplies the output of the voltage control oscillator 206 generated as a signal having a stable frequency of 24 MHz when a voltage supplied to a power terminal Vcc connected to one end of a resistor R is a "high" state, to the read-out controlling clock and sampling frequency terminal 203.

A second frequency divider 209 demultiplies the signal of 24 MHz outputted from the AND gate 208 into one third, and then supplies an 8 MHz signal to the write-in controlling clock and sampling frequency terminal 202. A third frequency divider 210 demultiplies the output (8 MHz) of the second frequency divider 209 by a predetermined value (8 MHz/3 fh), obtaining 8 MHz÷(8 MHz/3 fh) and then supplies a signal having a three times larger frequency (3 fh) than a horizontal synchronizing frequency, to a control signal terminal 201 of the triple speed circuit 100.

Figure 6:
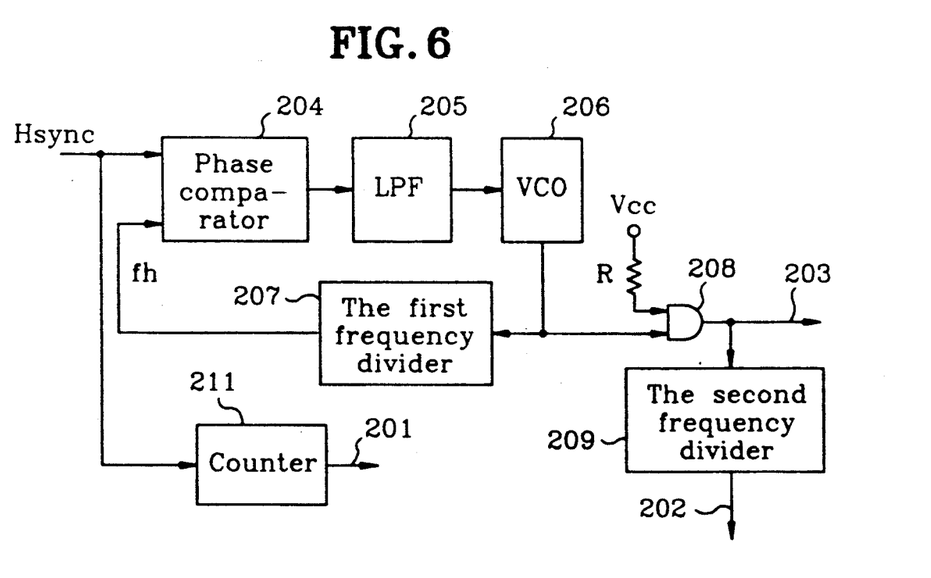
FIG. 6 is a schematic block diagram of another embodiment of the PLL circuit of the apparatus shown in FIG. 3.

FIG. 6 is a schematic block diagram of another embodiment of the PLL circuit 200 shown in FIG. 3.

The constitution of PLL circuit 200 shown in FIG. 6 is very similar to that of the PLL circuit 200 shown in FIG. 5 and accordingly the detailed description will be omitted, but the constitution of the circuit for generating an input signal 201 imputted in the clock terminal CLK of the counter 144 shown in FIG. 4 is different from each other.

In FIG. 5, to generate the signal 201, the signal 202 is frequency-divided through the third frequency divider 210 to output the signal of 3 fh having the frequency three times as large as the horizontal synchronizing frequency, but in FIG. 6, since the counter 211 for receiving the horizontal synchronizing signal Hsync and outputting pulse for every 175 H is included, the control signal 201 imputted in the counter 144 of FIG. 4 is a pulse signal having a period of 175 H. Here, "H" is the reciprocal of the horizontal synchronizing signal frequency fh=15.734 KHz, and is about 63.5 μs.

FIGS. 7a through 7d illustrate operational waveforms in tripling the speed in the triple speed circuit 100 shown in FIGS. 3 and 4 according to the present invention.

Figure 7A:
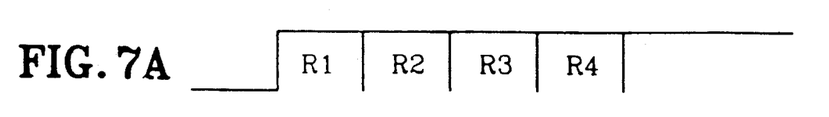
FIGS. 7a through 7d are waveform diagrams showing the operation of the triple speed circuit shown in FIGS. 3 and 4.
Figure 7B:
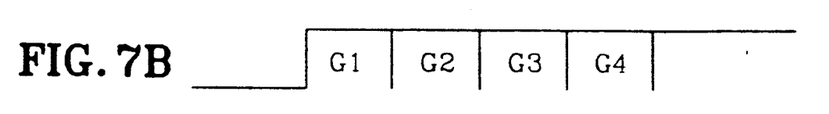
Figure 7C:
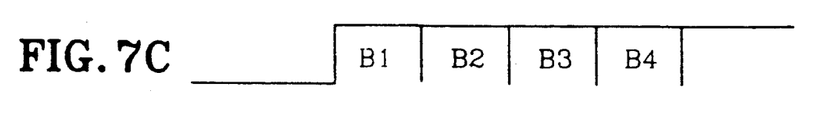

FIGS. 7a to 7c respectively corresponds to waveforms of digital data stored in the first to third memories 141 to 143, after being converted from red, green and blue analog signals inputted from the first to third A/D converters 121 to 123 shown in FIG. 4 in response to a 8 MHz sampling signal inputted to the write-in controlling clock and sampling frequency terminal 202.

Figure 7D:
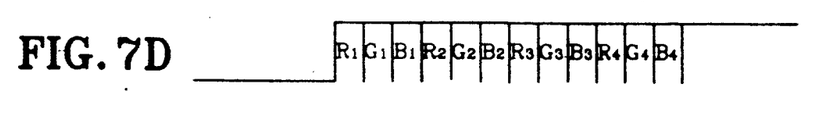

FIG. 7d shows waveform of data which are read out from the first to third memories 141 to 143 shown in FIG. 4 by a clock of 24 MHz inputted to the read-out controlling clock and sampling frequency terminal 203.

Figure 8A:
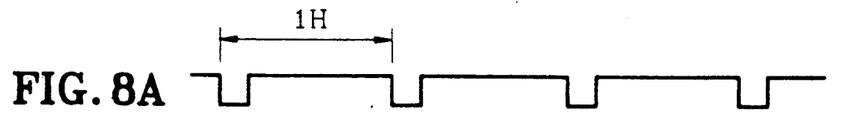
FIGS. 8a through 8g are waveform diagrams for explaining the operation of the shutter driver of FIG. 4, in relation to the output of the PLL circuit shown in FIG. 5.
Figure 8B:
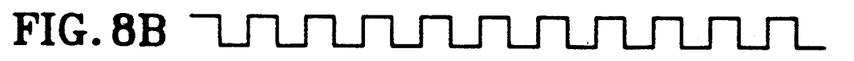
Figure 8C:
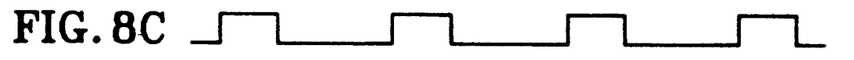
Figure 8D:
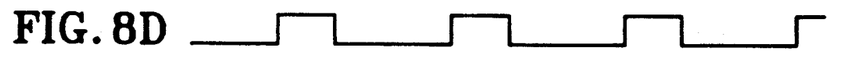
Figure 8E:
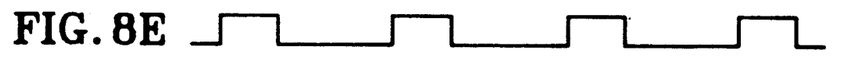
Figure 8F:
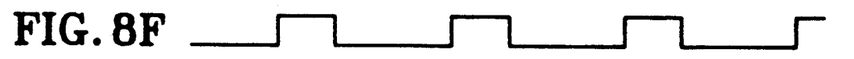
Figure 8G:
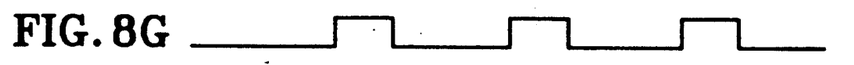

FIGS. 8a to 8g show waveforms for explaining the operation of the shutter driver of FIG. 4 according to the output of the PLL circuit shown in FIG. 5. FIG. 8a shows input waveform at the horizontal synchronizing terminal Hsync of the PLL circuit shown in FIG. 5, FIG. 8b illustrates output waveform of the third frequency divider 210, FIGS. 8c and 8d are waveforms showing outputs Qa and Qb of the counter 144 shown in FIG. 4, respectively, and FIGS. 8e through 8g shown waveforms of driving signals for respectively driving the first to thrid electronic liquid crystal shutters 80, 90 and 110 shown in FIG. 3, where the AND gates 501, 502 and the NOR gate 503 receive the result counted by the counter 144 according to the clock signal as shown in FIG. 8b inputted to the control clock terminal 201 of the triple speed circuit 100 shown in FIG. 4 and produces the output according to the logic value of the AND gates 501, 502 and the NOR gate 503.

Figure 10A:
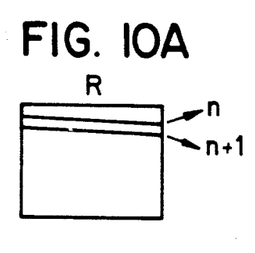
FIGS. 10a through 10d illustrate how to scan at a triple speed in a picture tube of FIG. 3 according to the output of the PLL circuit shown in FIG. 5.
Figure 10B:
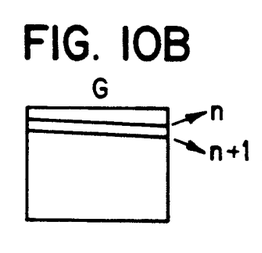
Figure 10C:
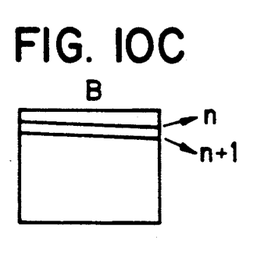
Figure 10D:
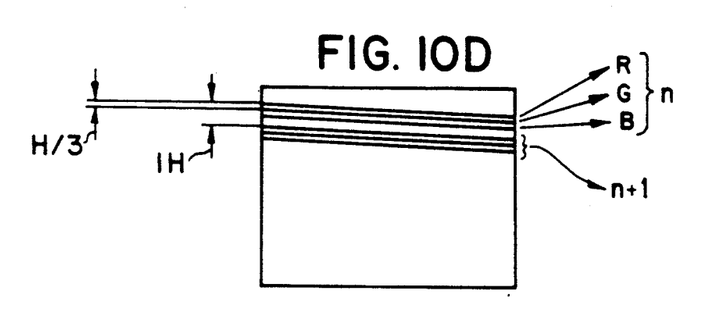

FIGS. 10a through 10d show triple speed scanning in a picture tube 300 of FIG. 3 according to the output of the PLL circuit shown in FIG. 5, where the speed of the conventional video signals of R, G and B as shown in FIGS. 10a to 10c are tripled and scanned as FIG. 10d.

Figure 11A:
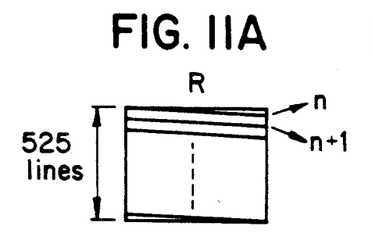
FIGS. 11a through 11d illustrate how to scan at a triple speed in a picture tube of FIG. 3 according to the output of the PLL circuit shown in FIG. 6.
Figure 11B:
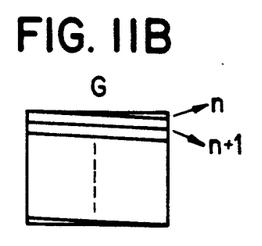
Figure 11C:
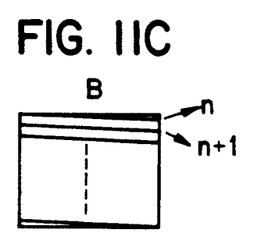

FIGS. 11a through 11d show triple speed scanning in the picture tube 300 of FIG. 3 according to the output of the PLL circuit shown in FIG. 6, where the conventional red, green and blue video signals as shown in FIGS. 11a through 11c are scanned on one screen by scanning red, green and blue frame data in the unit of 1 frame (525 lines). That is, red frame data is scanned over 525 lines of one screen for 175 H interval, green frame data is scanned over the next 525 lines of the screen for 175 H interval, and blue frame data is scanned over 525 lines of the screen for the next 175 H interval.

Now, operations of a preferred embodiment of the apparatus according to the present invention will be explained in detail with reference to accompanying drawings.

Referring to FIGS. 3, red, green, and blue analog video signals are inputted to the triple speed circuit 100 via red, green and blue input terminals R, G and B, and a horizontal synchronizing signal outputted from an unshown synchronous separator is inputted to a horizontal synchronizing terminal Hsync of the PLL circuit 200 shown in FIG. 3, as a signal having waveforms such as in FIG. 8a.

In the phase comparator 204 of the PLL circuit 200 constituted as shown in FIG. 5, the phase of a signal which has the same frequency (fh) as that of the horizontal synchronizing signal being fedback from the first frequency divider 207 is compared with the phase of an input signal of the horizontal synchronizing terminal Hsync. The compared difference generated in the phase comparator 204 is low-band filtered by the low-pass filter 205 to be converted into DC voltage level.

An oscillation frequency of the voltage control oscillator 206 is determined by the DC voltage level outputted from the low-pass filter 205, and then is locked to oscillate with a frequency of 24 MHz. In the first frequency divider 207, the frequency (24 MHz) of the output (24 MHz) of the voltage control oscillator 206 is divided by a predetermined value (24 MHz/fh), i.e. 24 MHz÷(24 MHz/fh), to generate a signal having a frequency (fh) corresponding to a horizontal frequency. The phase of this signal is compared with the phase of the horizontal synchronizing signal in the phase comparator 204, and then the phase difference of them is detected as described above. The difference value of phases is repeatedly fedback, thereby being locked so that a desirable stable frequency of 24 MHz is continuously outputted.

The signal of 24 MHz outputted from the voltage control oscillator 206 is inputted to one terminal of the AND gate 208, and the output terminal of the AND gate 208 outputs a signal of 24 MHz when a voltage supplied to a voltage terminal Vcc via a resistor R connected to another terminal of the AND gate 208 is a "high" state. The signal of 24 MHz is inputted to a read-out controlling clock and sampling frequency terminal 203 of the triple speed circuit 100.

On the other hand, if the frequency 24 MHz of the signal is demultiplied to one third in a second frequency divider 209 to be a signal of 8 MHz, the signal of 8 MHz is inputted to a write-in controlling clock and sampling frequency terminal 202 of the triple speed circuit 100. Then the frequency (8 MHz) of the signal is demultiplied by a predetermined value (8 MHz/3 fh), i.e. 8 MHz÷(8 MHz/3 fh), and then a signal (3 fh) having a three times larger frequency than a horizontal synchronizing frequency (fh) is generated as shonw in FIG. 8b, and then the signal (3 fh) is inputted to a control clock terminal 201 of the triple speed circuit 100.

Thus, according to the order in being inputted to red, green and blue terminals R, G, and B in the first to third A/D converter 121 to 123 of the triple speed circuit 100, analog video signals of red, green and blue colors are converted to digital signals by a sampling frequency inputted to the write-in controlling clock and sampling frequency terminals 202, i.e. 8 MHz, as shown in FIGS. 7a through 7c. In a first to third memories 141 to 143, if an output signal of the write-in controlling clock and sampling frequency terminal 202 is inputted to a write-in clock terminal WR CK, the output signal is counted in the memories to generate address signals. According to the address signals, the digital signals outputted from the first to the third A/D convert 121 to 123 are serially written in write-in regions of the first to third memories 141 to 143.

Then, the signal (3 fh) inputted to a control clock terminal 201 with a three times larger frequency than that of a horizontal synchronizing signal as shown in FIG. 8b is counted by the counter 144, and then outputted to output terminals Qa and Qb. Those outputs are generated in three phases and thus serially switching the switch 150 with a result that the 24 MHz signals fed to the read-out controlling clock and sampling frequency terminal 203, are inputted to the read-out clock terminal RD CK of the first to third memories 141-143, and being counted in the memories to form address signals for reading out. In response to the address signals, the data stored in the read-out memory region are to be read out. The reading is carried out by 24 MHz frequency, which is three times faster than the write-in frequency of 8 MHz, thus produces signals shown in FIG. 8d.

After passing through the switch 150, the red, green and blue digital data shown in FIG. 7d are converted to analog signals according to the 24 MHz frequency of the read-out controlling clock and sampling frequency terminal 203 in a D/A converter 160 and then are outputted.

The red, green and blue analog video signals of triple speed, outputted from the D/A converter 160, are fed to the electron gun of a monochrome picture tube 300. Then, composite synchronizing signals included in the red, green and blue video signals outputted from the converter 160, are separated into vertical and horizontal synchronizing signals by the synchronizing separation and deflection circuit 400, and are scanned to the picture tube 300 being controlled at the triple speed for the vertical and horizontal deflections. The result is that color video signals as shown in FIG. 8d, are displayed as high/low luminance signals, for example black/white signals, in the picture tube as shown in FIG. 10c.

On the other hand, the state of the output terminal Qb of the counter 144 of the triple speed circuit 100 is latched in the D flip flop 145, to sequentially clear the counter 144 at every "low" state, and the outputs of the outputs terminals Qa and Qb of the counter 144 are inputted to AND gates 501, 502 and the NOR gate 503 of a shutter driver 500.

When states of the output terminals Qa and Qb of the counter 144 are both "low", the output of the NOR gate 503 is "high", and when states of the output terminals Qa and Qb of the counter 144 are respectively "high" and "low", the output of the AND gate 501 is "high". And when states of the output terminals Qa and Qb of the counter 144 are "low" and "high", the output of the AND gate 502 becomes "high". In other words, when the output of the AND gate 501 is "high", the first electronic liquid crystal shutter 80 shown in FIG. 3 is turned on by the signal shown in FIG. 8e, and when the output of the AND gate 502 is "high", the second electronic liquid crystal shutter 90 is turned on by the signal shown in FIG. 8f. Further, when the output of the NOR gate 503 is "high", the third electronic liquid crystal shutter 110 is turned on by the signal shown in FIG. 8g. That is, the shutters are driven alternatively in order. At this time, the waveforms of FIGS. 8e through 8g which are generated according to counting of counter 144 receiving the signals of FIG. 8b, are for signals synchronized to the red, green and blue color video signals.

When the red, green and blue color video signals are scanned after compressing by H/3 as shown in FIG. 10d, the signals are displayed on the picture tube 300 in high/low luminance video signals such as in monochromatic video signals. Since a light has its natural wavelength according to its color, only the red component is reflected on a first dichroic mirror 40 and the blue and green components are transmitted, according to wavelengths. It is a basic characteristic of a dichroic mirror that only a ray of a certain wavelength is reflected and rays of the other wavelengths are transmitted. Then, the red component entered at 90° from the first dichroic mirror 40 is reflected by 90° on the first mirror 10. On the other hand, from the blue and green components transmitted from the first dichroic mirror 40, the green component is reflected by 90° and the blue component is transmitted according to the wavelength of the light, in a second dichroic mirror 50 and then the green component is again totally reflected by 90° on a second mirror 20.

At this time, the output of the AND gate 501 of the shutter driver 500 drives the first electronic liquid crystal shutter 80 to pass the red component reflected from the first mirror 10, and the output of the AND gate 502 drives the second electronic liquid crystal shutter 90 to pass the green component reflected from the second mirror 20. And, the output of the NOR gate 503 drives the third electronic liquid crystal shutter 110 to pass the blue component transmitted from the second dichroic mirror 50.

The red component which has passed the first electronic liquid crystal shutter 80 is totally reflected by 90° on the third mirror 30 and then is transmitted to the third dichroic mirror 60, and the green component which has passed the second electronic liquid crystal shutter 90 is reflected by 90° on the third dichroic mirror 60 and then enters to a fourth dichroic mirror 70. Further, in accordance with wavelengths of the light, the blue component which has passed the third electronic liquid crystal shutter 110 is transmitted in a fourth dichroic mirror 70, and the red component which has passed the third dichroic mirror 60 is reflected, and then the red, green and blue components are focused by a lens 600, so that a color picture is projected on a screen. At this time, according to the magnification factor of the lens 600, the color image from the fourth dichroic mirror 70 can be magnified.

As described in the preferred embodiment of the present invention, when the triple speed circuit 100 triples the speeds of the red, blue and green signal data and supplies the data to the picture tube 300, the red, green and blue signal data are written in or read out from the first to third memories 141 to 143, i.e., the three line memories line-by-line according to the control signal, i.e., write-in/read-out controlling clock signals 202 and 203 and a counter controlling signal 201, supplied from the PLL circuit 200. During reading out, the red, green and blue signals are outputted at the triple speed using the read-out controlling signal 203 having the frequency three times as large as that during the writing-in and the signal 201 for controlling the counter 144 having the frequency three times as large as the horizontal synchronizing frequency. At this time, as shown in FIGS. 10a through 10d, the respective red, green and blue signals actually have the location error or H/3 line as a maximum by compressing and scanning the red, green and blue signals, respectively every H/3 interval during a 1 H interval. At this time, the line memory used should have the capacity enough to store the signal data of respective H/3 lines of R, G, and B signals.

Next, the PLL circuit 200 used in the picture projecting apparatus of the present invention receives the horizontal synchronizing frequency Hsync using the counter 211 as shown in FIG. 6 so that the counter controlling signal 201 shown in FIG. 4 is counted in the counter 211 as a signal having a synchronizing frequency signal period of 175 H and outputted.

At this time, in the one frame interval, i.e. 3×175 H, the output Qa of the counter 211 is outputted as a high signal in the first 175 H interval and the output Qb is outputted as a high signal in the next 175 H interval and the outputs Qa and Qb are outputted as low signals in the other 175 H intervals.

At this time, the switch 150 receives the outputs Qa and Qb and according to the read-out controlling clock and the sampling frequency signal 203, its output terminals 4 and 4' are connected to the input terminals 1 and 1' when the Qa is high and Qb is low, and are connected to the input terminals 2 and 2' when the Qa is low and Qb is high, and are connected to the input terminals 3 and 3' when both Qa and Qb are low, thereby outputting red, green and blue frame signals every 175 H. The red, green and blue frame signals are converted into the analog signals in the D/A converter 160 according to the sampling frequency signal 203 and are supplied to the picture tube 300 via the output line 170.

Figure 11D:
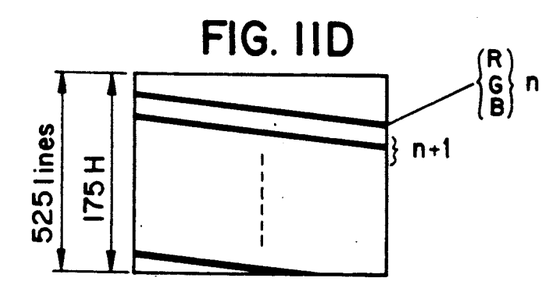

The red, green and blue frame signals supplied to the picture tube 300 are respectively scanned as red, green and blue frame signals of 525 lines for 175 H, as shown in FIGS. 11a through 11d, so that the red, green and blue signals are overlapped without any interval in each line and are displayed as shown in FIG. 11d.

As described above, to write-in and read-out the red, green and blue frame data in or from the memory, the frame memory enough to store the frame data of at least one frame capacity is used.

As described above, according to the present invention, there is economically provided a projection display system which can project color picture of high resolution on a large screen by using only one monochrome picture tube.

DESCRIPTION OF FIGS. 9a THROUGH 9g

Figure 9A:
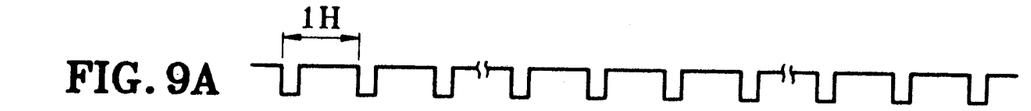
FIGS. 9a through 9g are waveform diagrams for explaining the operation of the shutter driver of FIG. 4, in relation to the output of the PLL circuit shown in FIG. 6.
Figure 9B:
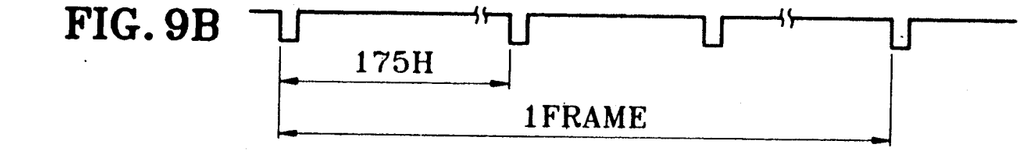
Figure 9C:
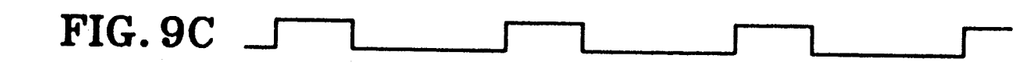
Figure 9D:
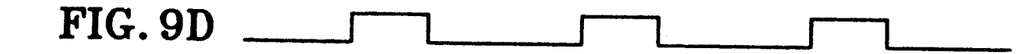
Figure 9E:
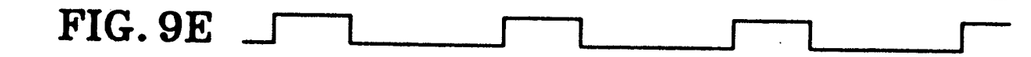
Figure 9F:
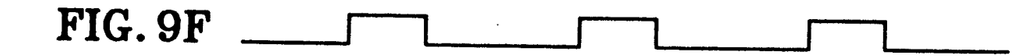
Figure 9G:
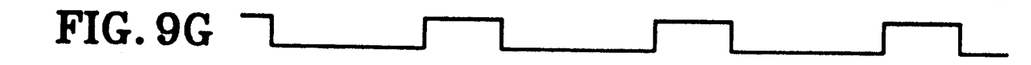

FIGS. 9a to 9g show waveforms for explaining the operation of the shutter driver of FIG. 4 according to the output of the PLL circuit shown in FIG. 6. FIG. 9a shows input waveform at the horizontal synchronizing terminal Hsync of the PLL circuit shown in FIG. 6, FIG. 9b illustrates output waveform of counter 211. FIGS. 9c and 9d are waveforms showing outputs Qa and Qb of the counter 144 shown in FIG. 4, respectively. FIGS. 9a through 9g, show waveforms of driving signals for respectively driving the first to third electronic liquid crystal shutters 80, 90 and 110 shown in FIG. 3, where the AND gates 501 and 502 and the NOR gate 503 receive the result counted by the counter 144 according to the clock signal as shown in FIG. 9b inputted to the control clock terminal 201 of the triple speed circuit 100 shown in FIG. 4 and produces the output according to the logic value of the AND gates 501 and 502 and the NOR gate 503.

DETAILED DESCRIPTION OF THE PREFERRED EMBODIMENT

While the invention has been described in connection with what is presently considered to be the most practical and preferred embodiments, it is understood that the invention is not limited to the disclosed embodiment, but, on the contrary, is intended to cover various modifications and equivalent arrangements included within the spirit and scope of the appended claims.

What is claimed is:

1. A picture projecting method for a projection display system comprising the steps of:
   multiplying a speed of each of video signals for converting red, green and blue color video signals into serial color video signals having a predetermined multiplied speed;
   converting said serial color video signals to light signals each having a light wavelength corresponding to each of the red, green and blue color video signals via a monochrome picture tube;
   separating a red, green and blue monochrome component signals from said converted light signals; and
   focusing said separated red, green and blue component signals on a screen.

2. A method as claimed in claim 1, wherein during said focusing step, said red, green and blue component signals are focused to display on said screen by controlling a focusing magnification factor.

3. A picture projecting method for a projection display system comprising the steps of:
   converting a speed of each of a red, green and blue color video signal including synchronizing signals to a tripled speed in accordance with a predetermined control signal generated from a horizontal synchronizing signal by a PLL method, to output the converted signals in series;
   separating a vertical and horizontal synchronizing signals from said red, green and blue signals with said triple speed output from said triple speed converting step;
   receiving, in series, said red, green and blue video signals with said tripled speed from said tripled speed converting step, deflecting said received signals according to the vertical and horizontal signals output from said synchronizing signal separating step, and displaying said deflected signals in monochrome on a monochrome picture tube;
   selectively separating and reflecting a red, green and blue component signals according to light wavelengths, from a monochromatic light signal displayed in said displaying step;
   selecting said separated red, green and blue component signals from said separating and reflecting step in response to a predetermined control signal supplied from said tripled-speed converting step to selectively transmit said red, green and blue component signals; and
   focusing and mixing said red, green and blue component signals selected in said selecting step to magnify and project said composite signals on a screen by controlling a focusing magnification factor.

4. A picture projecting apparatus for a projection display system comprising:
   phase locked loop circuit means for generating variable frequency synchronization signals in response to a horizontal synchronizing signal input thereto;
   tripled video signal generating means for receiving red, green and blue video signals and generating a tripled video signal being a composite video signal representation of said red, green and blue video signals, said tripled video signal being generated in response to the variable frequency synchronization signals output from said phase locked loop circuit means;
   synchronous detection means for receiving the tripled video signal from said tripled video signal generating means and generating vertical and horizontal deflection signals in response thereto;
   a picture tube having an electron gun for receiving the tripled video signal from said tripled video signal generating means and the vertical and horizontal deflection signals from said synchronous detection means and generating red, green and blue monochromatic light signals in response thereto;
   a shutter driver circuit responsive to decoding signals from said tripled video signal generating means for generating shutter driver switching control signals;
   a plurality of electronic shutter means, each electronic shutter means for sequentially passing respective red, green and blue monochromatic light signals from said picture tube in response to a corresponding shutter driver switching control signal from said shutter driver circuit;
   a first set of mirrors for reflecting each respective red, green and blue monochromatic light onto a corresponding one of said plurality of electronic shutter means; and
   a second set of mirrors for reflecting monochromatic light signals, sequentially passed from said plurality of electronic shutter means, onto a focusing lens, said focusing lens projecting each transmitted monochromatic light signal onto a large color screen.

5. A picture projecting apparatus as claimed in claim 4, wherein said phased locked loop circuit means comprises:
   means for receiving the horizontal synchronous signal input thereto and generating a read-out clock sampling signal in response thereto; and
   frequency dividing means responsive to said read-out clock sampling signal for generating a write-in clock sampling signal and a control clock sampling signal.

6. A picture projecting apparatus as claimed in claim 5, wherein said tripled video signal generating means comprises:
   three A/D converters for receiving each of said red, green and blue video signals, respectively, and generating a respective digitally sampled signal having a frequency in accordance with said write-in clock sampling signal;
   three memory storage means, each memory storage means for storing a respective one of said red, green and blue digitally sampled signals, each memory storage means being enabled to read out information stored therein in response to the read-out clock sampling signal from said phase locked loop circuit means;

a counter for receiving the control clock sampling signal from said phase locked loop circuit means and generating decoding signals in response thereto; and switching means responsive to the decoding signals from said counter for alternately and sequentially inputting the respective serially enabled outputs of each corresponding one of said three memory storage means into an input of a D/A converter, said D/A converter generating said tripled video signal in response thereto.

7. A picture projecting apparatus as claimed in claim 6, wherein the read-out clock sampling signal has a frequency three times faster than the frequency of the write-in clock sampling signal, the red, green and blue digitally sampled signals being read out consecutively from each respective one of said three memory storage means to provide a composite red, green and blue digital signal having a frequency in accordance with said read-out clock sampling signal and then fed to the input of said D/A converter.

8. A picture projecting apparatus as claimed in claim 7, wherein said three memory storage means sequentially store a sequence of respective red, green and blue video signals every one horizontal synchronizing signal.

9. A picture projecting apparatus as claimed in claim 8, wherein every sequence stored in the three memory means is sequentially passed from said plurality of electronic shutter means such that 525 lines of overlapped red, green and blue video signals are scanned every 175 horizontal synchronizing signals to form a color image frame onto the large color screen.

10. A method for projecting a color image on a screen of a projection display system comprising the steps of:
generating variable frequency synchronization signals in response to a horizontal synchronizing signal;
receiving red, green and blue video signals and generating, in response to decoding signals, a tripled video signal being a composite video signal representation of said red, green and blue video signals, said tripled video signal being generated in response to the variable frequency synchronization signals and the decoding signals;
receiving the tripled video signal and generating vertical and horizontal deflection signals in response thereto;
receiving the tripled video signal and the vertical and horizontal deflection signals and generating red, green and blue monochromatic light signals in response thereto;
generating shutter driver switching control signals in response to the decoding signals;
transmitting the shutter driver switching signals to a plurality of electronic shutter means, each electronic shutter means for sequentially passing respective red, green and blue monochromatic light signals in response to a corresponding shutter driver switching control signal;
using a first set of mirrors to reflect each respective red, green and blue monochromatic light onto a corresponding one of said plurality of electronic shutter means; and
using a second set of mirrors to reflect monochromatic light signals, sequentially passed from said plurality of electronic shutter means, onto a focusing lens, said focusing lens projecting each transmitted monochromatic light signal onto a large color screen.

11. The method for projecting a color image as claimed in claim 10, wherein said step for generating variable frequency synchronization signals comprises the steps of:
receiving a horizontal synchronous signal and generating a read-out clock sampling signal in response thereto; and
frequency dividing said read-out clock sampling signal for generating a write-in clock sampling signal and a control clock sampling signal.

12. The method for projecting a color image as claimed in claim 11, wherein said steps for generating decoding signals and for receiving and generating a tripled video signal comprise the steps of:
receiving each of said red, green and blue video signals and performing A/D conversion of each respective signal;
generating a respective digitally sampled signal having a frequency in accordance with said write-in clock sampling signal;
storing a respective one of said red, green and blue digitally sampled signals in a respective one of three memory storage means, each memory storage means being enabled to read out information stored therein in response to the read-out clock sampling signal;
counting the signal transitions from the received control clock sampling signal and generating the decoding signals in response thereto; and
selectively switching a digital switch responsive to said decoding signals for alternately and sequentially inputting the respective serially enabled outputs of each corresponding one of said three memory storage means into an input of a D/A converter, said D/A converter generating said tripled video signal in response thereto.

13. The method for projecting a color image as claimed in claim 12, wherein the read-out clock sampling signal has a frequency three times faster than the frequency of the write-in clock sampling signal, the red, green and blue digitally sampled signals being read out consecutively from each respective one of said three memory storage means to provide a composite red, green and blue digital signal having a frequency in accordance with said read-out clock sampling signal and then fed to the input of said D/A converter.

14. The method for projecting a color image as claimed in claim 13, wherein said three memory storage means sequentially store a sequence of respective red, green and blue video signals every one horizontal synchronizing signal.

15. The method for projecting a color image as claimed in claim 14, wherein every sequence stored in the three memory means is sequentially passed from said plurality of electronic shutter means such that 525 lines of red, green and blue video signals are scanned every 175 horizontal synchronizing signals to form a color image frame onto the large color screen.

16. A picture projecting display system comprising:
means for multiplying a speed of each of video signals for converting red, green and blue color video signals into serial color video signals having a predetermined multiplied speed;
means for converting said serial color video signals to light signals each having a light wavelength corresponding to each of the red, green and blue color video signals via a monochrome picture tube;

means for separating a red, green and blue monochrome component signals from said converted light signals; and means for focusing said separated red, green and blue component signals on a screen.

17. The system of claim 16, wherein said focusing means comprises focusing magnification factor control means for focusing said red, green and blue component signals.

18. A picture projecting display system comprising:

means for converting a speed of each of a red, green and blue color video signal including synchronizing signals to a tripled speed in accordance with a predetermined control signal generated from a horizontal synchronizing signal by a PLL method, to output the converted signals in series;

means for separating a vertical and horizontal synchronizing signals from said red, green and blue signals with the tripled speed output from said converting means;

display means for receiving, in series, said red, green and blue video signals with said tripled speed from said converting means, deflecting said received signals according to the vertical and horizontal signals output from said separating means, and displaying said deflected signals in monochrome on a monochrome picture tube;

means for selectively separating and reflecting a red, green and blue component signals according to light wavelengths, from a monochromatic light signal displayed in said displaying means;

means for selecting said separated red, green and blue component signals from said display means in response to a predetermined control signal supplied from said converting means to selectively transmit said red, green and blue component signals; and means for focusing and mixing said red, green and blue component signals selected in said selecting means to magnify and project said composite signals on a screen by controlling a focusing magnification factor control means.

* * * * *